United States Patent
Li et al.

(10) Patent No.: US 11,962,047 B2
(45) Date of Patent: Apr. 16, 2024

(54) SYSTEM AND METHODS FOR MONITORING AND CONTROLLING EMISSIONS FROM FUEL CELL ENGINES

(71) Applicant: CUMMINS INC., Columbus, IN (US)

(72) Inventors: Mingjian Li, Wuhan (CN); Guangji Ji, Wuhan (CN)

(73) Assignee: CUMMINS INC., Columbus, IN (US)

(*) Notice: Subject to any disclaimer, the term of this patent is extended or adjusted under 35 U.S.C. 154(b) by 170 days.

(21) Appl. No.: 17/707,443

(22) Filed: Mar. 29, 2022

(65) Prior Publication Data
US 2022/0320546 A1 Oct. 6, 2022

(30) Foreign Application Priority Data

Mar. 30, 2021 (CN) .......................... 202110341347.2

(51) Int. Cl.
| | |
|---|---|
| *H01M 8/04746* | (2016.01) |
| *B60L 58/30* | (2019.01) |
| *H01M 8/04223* | (2016.01) |
| *H01M 8/0438* | (2016.01) |
| *H01M 8/0444* | (2016.01) |
| *H01M 8/04791* | (2016.01) |

(52) U.S. Cl.
CPC ......... *H01M 8/04761* (2013.01); *B60L 58/30* (2019.02); *H01M 8/0444* (2013.01); *B60L 2270/12* (2013.01); *H01M 8/04231* (2013.01); *H01M 8/04402* (2013.01); *H01M 8/04462* (2013.01); *H01M 8/04753* (2013.01); *H01M 8/04805* (2013.01); *H01M 2250/20* (2013.01)

(58) Field of Classification Search
CPC ........... H01M 8/04761; H01M 8/0444; H01M 8/04231; H01M 8/04402; H01M 8/04462; H01M 8/04753; H01M 8/04805; H01M 2250/20; B60L 58/30; B60L 2270/12
See application file for complete search history.

(56) References Cited

U.S. PATENT DOCUMENTS

| | | |
|---|---|---|
| 10,511,038 B2 | 12/2019 | Suh et al. |
| 2006/0263658 A1 | 11/2006 | Yanagi et al. |
| 2009/0035614 A1 | 3/2009 | Wake et al. |
| 2020/0144642 A1 | 5/2020 | Kwon et al. |
| 2021/0020968 A1 | 1/2021 | Kwon et al. |

FOREIGN PATENT DOCUMENTS

| | | | |
|---|---|---|---|
| CN | 110783607 | * | 2/2020 |
| JP | 2006324058 | | 11/2006 |
| JP | 5199683 | | 5/2013 |
| KR | 101748275 | | 6/2017 |
| KR | 101867758 | | 6/2018 |
| WO | 2008083706 | | 7/2008 |

* cited by examiner

*Primary Examiner* — Matthew W Van Oudenaren
(74) *Attorney, Agent, or Firm* — Barnes & Thornburg LLP

(57) ABSTRACT

The present disclosure generally relates to monitoring and controlling emissions produced by a fuel cell or fuel cell stack in a fuel cell engine of a vehicle and/or powertrain.

20 Claims, 2 Drawing Sheets

SYSTEM AND METHODS FOR MONITORING AND CONTROLLING EMISSIONS FROM FUEL CELL ENGINES

CROSS-REFERENCE TO RELATED APPLICATIONS

This non-provisional application claims the benefit and priority, under 35 U.S.C. § 119(b) and any other applicable laws or statutes, to Chinese Invention Application Serial No. 202110341347.2 filed on Mar. 30, 2021, the entire disclosure of which is hereby expressly incorporated herein by reference.

TECHNICAL FIELD

The present disclosure relates to a system and methods for monitoring and controlling emissions produced by a fuel cell or fuel cell stack in an engine of a vehicle and/or powertrain.

BACKGROUND

Vehicles and/or powertrains that use engines, such as fuel cell engines, for their power needs operate in places with varying geographical, morphological, and regulatory conditions. In some locations, governmental or other regulatory bodies may impose restrictions on regulations on the level, concentration, and/or amount of emissions that are legally allowed to be used and/or prohibited from being used by any vehicle and/or powertrain. In other instances, regulatory bodies may provide publicly available and/or known standards of emissions or exhaustion, such as the amount of chemicals and/or compounds released from a vehicle and/or powertrain that will be tolerated within its geographical areas and/or within different time periods.

In many vehicles and/or powertrains, fuel cell engines using hydrogen or hydrogen based fuel freely vent chemicals and/or compounds (e.g., hydrogen) into the atmosphere or ambient surrounding without any oversight and/or restrictions of the amount or concentration of hydrogen being released. For some vehicles and/or powertrains, there may be minimal to no oversight on the chemicals and/or compounds (e.g., hydrogen) being vented into the atmosphere by the fuel cell engines. In many cases, the concentration of the chemicals and/or compounds (e.g., hydrogen) in the emission of the fuel cell engines that is being released into the atmosphere is not known.

Hydrogen is a flammable gas with a wide flammability range (e.g., from about 4% to about 75% by volume, and any specific percentage comprised therein) and relatively low ignition energy (e.g., about 0.02 millijoules). Based on the properties of hydrogen, safety requirements are necessary for various applications. The safety guidelines of fuel cell vehicle, 2020 in China requires that the continuous concentration of hydrogen in the emission of a fuel cell engine using hydrogen or a hydrogen based fuel be less that about 4% in a three (3) second period. The safety guidelines also requires that the transient concentration of the hydrogen in the emission of a fuel cell engine using hydrogen or a hydrogen based fuel be less than about 8%, independent of any time period of evaluation or investigation. However, vehicles and/or powertrains do not generally have a system that allows for the controlling, monitoring, and/or managing of the hydrogen in the emissions produced by fuel cell engines. The present specification provides a system and methods for determining, monitoring, controlling, and/or managing the hydrogen concentration in the emissions produced by a fuel cell engine used to power a vehicle and/or powertrain.

SUMMARY

In one aspect, the present disclosure relates to a control system for monitoring and controlling emissions produced by a fuel cell engine in a vehicle and/or powertrain. The control system comprises an exhaust mixer where purged hydrogen from the fuel cell engine is mixed with air before being released to the ambient surrounding, a purge valve that passes purged hydrogen from the fuel cell engine to the exhaust mixer, a hydrogen flow sensor that detects the hydrogen flow to the exhaust mixer, a hydrogen concentration sensor that detects the concentration of hydrogen in the exhaust mixer, an air handling device that passes air into the fuel cell engine, a back pressure valve that passes air from the fuel cell into the exhaust mixer, and a controller that communicates with the purge valve, the back pressure valve, the hydrogen flow sensor, the hydrogen concentration sensor, and the air handling device to control the power provided to the vehicle and/or powertrain at a target hydrogen concentration.

In one embodiment of the present system, the controller sets a purge delay time and/or a width time of the purge valve and the hydrogen flow sensor may be located in front (or upstream) of or behind (or downstream of) the purge valve. In other embodiments, the controller determines the volume of hydrogen from the fuel cell engine based on the purge delay time and/or the width time of the purge valve.

In one embodiment of the present system, the controller adjusts the air flow by changing the speed of the air handling device. In other embodiments, the controller adjusts the backpressure valve opening.

In one embodiment of the present system, the hydrogen concentration sensor detects the concentration of purged hydrogen in the exhaust mixer. In one embodiment, when the hydrogen concentration sensor detects the concentration of purged hydrogen to be greater than the target hydrogen concentration, then the controller increases the air handling and adjusts the opening of the backpressure valve to increase the air flow, or adjusts a purge delay time and a width time of the purge valve to decrease the volume of purged hydrogen being passed through the purge valve. In a further embodiment, when the hydrogen concentration sensor detects the concentration of purged hydrogen to be less than the target hydrogen concentration, then the controller decreases the air handling device speed and adjusts the opening of the backpressure valve to decrease the air flow, or adjusts a purge delay time and a width time of the purge valve to increase the volume of purged hydrogen being passed through the purge valve.

In one embodiment of the present system, the controller communicates with a current sensor to detect the operating current of stack. In another embodiment, the target hydrogen concentration is up to about 8% by volume, at least 0.1% by volume or in the range of about 0.1% to about 8% by volume.

In another aspect, the present disclosure relates to a method of monitoring and controlling hydrogen emission concentrations of a fuel cell engine in a vehicle and/or powertrain. The method includes setting a purge delay time and/or width time of a purge valve, calculating volume of purged hydrogen passing through the purge valve, determining an amount of air that is exhausted from an air handling device into the fuel cell engine, mixing purged air and purged hydrogen in an exhaust mixer to form an exhaust, monitoring concentration of purged hydrogen in the exhaust formed in the exhaust mixer by using a hydrogen concentration sensor, and releasing the exhaust from the exhaust mixer.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure relates to a system (e.g., a control system) and a method for determining, monitoring, controlling, and/or managing emissions from a vehicle and/or powertrain. The present disclosure also provides a system and a method for maintaining the emission concentration of different gases and/or particulates under different target values based on the different operating conditions of the vehicle and/or powertrain. Any fluid may be an emission of the vehicle and/or powertrain, including but not limited to nitrous oxide, hydrocarbons, carbon monoxide, carbon dioxide, and/or hydrogen.

A vehicle and/or powertrain of the present system or methods may be powered by an engine. Any engine may be comprised in the present invention. In an exemplary embodiment, the engine may be a fuel cell engine. In another embodiment, the engine may be a hybrid engine that has at least one fuel cell engine in addition to other power sources (e.g., battery, internal combustion engine, wind turbine, etc.). In a further embodiment, the engine consists essentially of one or more fuel cell engines.

The fuel cell engine of the present system and method comprises one or more fuel cells or one or more fuel cell stacks. The fuel cell or fuel cell stacks may be any type of fuel cell. For example, the fuel cell and/or fuel cell stack may include, but are not limited to, a phosphoric acid fuel cell (PAFC), a molten carbonate fuel cell (MCFC), a proton exchange membrane fuel cell, also called a polymer exchange membrane fuel cell (PEMFC), and a solid oxide fuel cell (SOFC). In one embodiment, the fuel cell or the fuel cell stacks is a PEMFC.

The fuel cell engine may be powered by a fuel. The fuel of the present disclosure may be any fuel known in the art to power a vehicle and/or powertrain. In some embodiments, the fuel is hydrogen ($H_2$) or is a hydrogen-based fuel. In other embodiments, the fuel may be a hydrocarbon fuel, a natural gas, a gasoline, etc.

Figure 1:
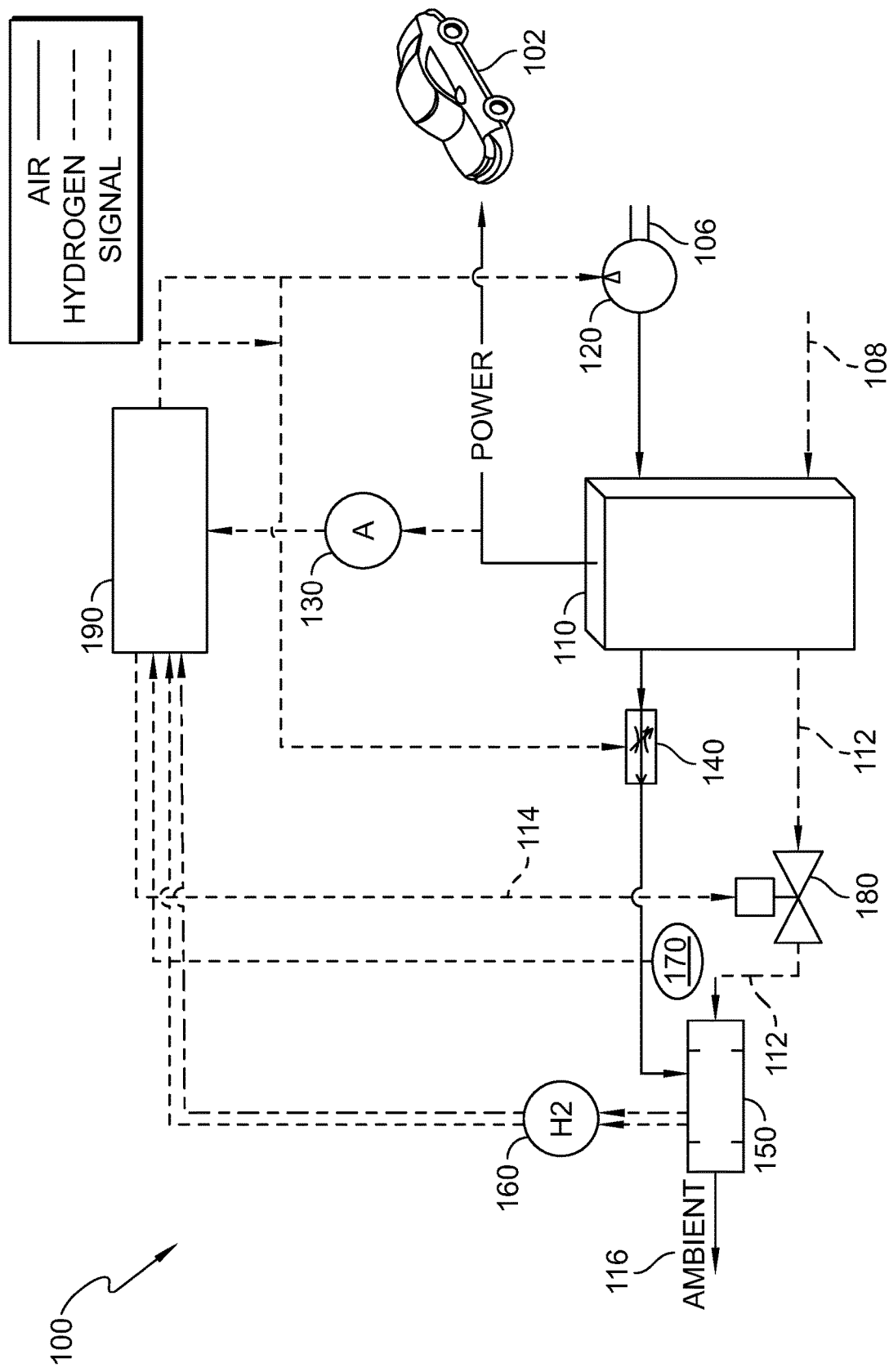
FIG. 1 is a schematic illustration of one embodiment of a system in a vehicle and/or powertrain for monitoring and controlling emissions produced by a fuel cell engine.

In an illustrative embodiment, FIG. 1 shows a system 100 for monitoring and controlling hydrogen emission concentration in the exhaust of a fuel cell engine 110 of a vehicle and/or powertrain 102. The hydrogen 108 used to power the fuel cell engine 110 is exhausted from the fuel cell engine 110 as purged hydrogen 112 through a purge valve 180 into an exhaust mixer 150 where the purged hydrogen 112 is mixed with purged air 114 exhausted from the fuel cell engine 110. The purged hydrogen 112 and purged air 114 are mixed in the exhaust mixer 150 to form an exhaust 116 that is released into the ambient surrounding. The purge valve 180 may be located at a fuel cell or fuel cell stack outlet internal to the fuel cell engine 110 or external to or on the outside of the fuel cell engine 110. A hydrogen flow sensor 170 may be located in front (or upstream) of or behind (or downstream of) the purge valve 180.

Incoming air 106 is sent into the fuel cell engine 110 through an air handling device, such as a variable air flow regulator, a blower, and/or an air compressor 120. In an exemplary embodiment, the air handling device is an air compressor 120. Air 106 is then exhausted through a back-pressure valve 140 from the fuel cell engine 110. The purged air 114 enters the exhaust mixer 150 after passing through the back pressure valve 140. A hydrogen concentration sensor 160 in the exhaust mixer 150 is used to determine the concentration of purged hydrogen 112 in the exhaust 116 that is being released into the ambient surrounding.

The exhaust 116 may comprise any fluids. Fluids may comprise gases, liquids, vapors, etc. Typical exhaust fluids include, but are not limited to hydrogen, nitrogen, oxygen, and water vapor.

In one embodiment, a system 100 for monitoring and controlling hydrogen emission concentration in the exhaust of a fuel cell engine 110 includes a controller 190. The controller 190 controls and communicates with the system 100 and one or more of the system components, including but not limited to the fuel cell engine 110. In one embodiment, the controller 190 may control and/or manage the fuel cell engine 110, the back pressure valve 140, the exhaust mixer 150, the hydrogen flow sensor 170, the air compressor 120, and other components of the system and method. In another embodiment, the controller 190 may control and/or manage the purge valve 180.

For example, the controller 190 may control and/or manage the purge delay time and/or width time of the purge valve 180 to determine the amount of purged hydrogen 112 that enters the exhaust mixer 150. The controller 190 may set the purge delay time and/width time of the purge valve 180. The controller 190 may calculate the volume of purged hydrogen 112 passing through the purge valve 180 based on the set purge delay time and/or width time of the purge valve 180.

In one embodiment, the controller 190 in a system 100 for monitoring and controlling hydrogen emission concentration in the exhaust 116 of a fuel cell engine 110 may use the hydrogen flow sensor 170 to monitor the purge volume of hydrogen 112 passing through the purge valve 180. The controller 190 may receive or obtain information from the hydrogen concentration sensor 160 about the concentration of hydrogen 112 in the exhaust mixer 150. In some embodiments, the controller may determine or calculate the volume, amount, or concentration of purged hydrogen 112 passing through the purge valve 180.

In other embodiment, the data or information obtained by the controller 190 provides information about the hydrogen emission concentration target. In other embodiment, the information obtained by the controller 190 provides instructions, based on geographical and/or regulatory rules and guidelines, to adjust the hydrogen concentration levels. In some embodiments, the information obtained by the controller may be the target hydrogen concentration levels based on geographical locations and/or state of performance of the vehicle and/or powertrain 102 comprising and/or being managed by the controller 190.

For example, in some embodiments, the controller 190 may adjust the flow of air 106 through the fuel cell engine 110 in order to dilute the hydrogen concentration. The controller 190 may also adjust the flow of air 106 by adjusting the speed of the air compressor 120 and/or managing the opening of the backpressure valve 140. Thus, the controller 190 may also determine the amount of purged air 114 that is exhausted from the fuel cell engine 110 into the exhaust mixer 150 in order to adjust, manage, and/or control the hydrogen emissions from the vehicle and/or powertrain 102.

If the hydrogen concentration measured by the hydrogen concentration sensor 160 is higher than the emission concentration target, which may, for example, be based on geographical and/or regulatory rules, the controller 190 may also adjust the flow of incoming air 106, purged air 114, or purged hydrogen 112. For example, the controller 190 may increase the speed of the air compressor 120, adjust the opening of the backpressure valve 140, and/or decrease the purge volume of hydrogen by adjusting the purge valve 180. Conversely, if the hydrogen concentration is less than the emission concentration target, which may, for example, be based on geographical and/or regulatory rules, the controller 190 may decease speed of the air compressor 120, adjust the opening of the backpressure valve 140, and/or increase the purge volume of hydrogen by adjusting the purge valve 180.

In one embodiment, the controller 190 may get information from the current sensor 130 about the power needs of the vehicle and/or powertrain 102. This information may aid the controller 190 to manage the functioning of the back pressure valve 140, the purge valve 180, and/or the air compressor 120. The power needs of a vehicle and/or powertrain 102 may determine the amount of fuel (e.g., hydrogen based fuel) 108 that is required by the fuel cell engine 110. In some embodiments, the controller 190 may receive or obtain information from the current sensor 130 about the power needs of the vehicle and/or powertrain 102 over a given period of time.

In one embodiment, the controller 190 may use a closed-loop feedback system to determine, control, monitor, and/or manage the hydrogen emission concentration in the exhaust of a fuel cell engine 110 of a vehicle and/or powertrain 102. In other embodiments, the controller 190 may use information from external sources (not shown) to determine the functioning of the fuel cell engine 110, the purge valve 180, the back pressure valve 140, and/or the air compressor 120, and other system components.

In one embodiment, the controller 190 in a system 100 for monitoring and controlling hydrogen emission concentration in the exhaust of a fuel cell engine 110 may communicate with the components of the system 100. For example, the controller may communicate with the fuel cell engine 110, the hydrogen concentration sensor 160, the hydrogen flow sensor 170, the backpressure valve 140, the purge valve 180, the current sensor 130, and/or the air compressor 120 using one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) In one embodiment, the controller 190 in a system 100 for monitoring and controlling hydrogen emission concentration in the exhaust of a fuel cell engine 110 may communicate with the hydrogen concentration sensor 160, the hydrogen flow sensor 170, the backpressure valve 140, the purge valve 180, the 130, and the air compressor 120 in real time or automatically to affect the functioning of the fuel cell engine 110 in the vehicle and/or powertrain 102.

In one embodiment, the controller 190 in a system 100 for monitoring and controlling hydrogen emission concentration in the exhaust of a fuel cell engine 110 is present on the vehicle and/or powertrain 102 comprising the fuel cell engine 110. In other embodiments, the controller 190 in the system 100 for monitoring and controlling hydrogen emission concentration in the exhaust of a fuel cell engine 110 is not present on the vehicle and/or powertrain 102 comprising the fuel cell engine 110. In some embodiments, the controller 190 in a system 100 for monitoring and controlling hydrogen emission concentration in the exhaust of a fuel cell engine 110 is operated and/or activated remotely, automatically, programmatically, systemically, or locally. In some further embodiments, the controller 190 in a system 100 for monitoring and controlling hydrogen emission concentration in the exhaust of a fuel cell engine 110 is operated and/or activated on the vehicle and/or powertrain 102, such as by a user or an operator.

In one embodiment, the controller 190 in a system 100 for monitoring and controlling hydrogen emission concentration in the exhaust of a fuel cell engine 110 may meet the power needs of the vehicle and/or powertrain 102 comprising the fuel cell engine 110 while also aligning with the emission criteria and/or regulations of the geographic region where the vehicle and/or powertrain 102 is operating. In some embodiments, the controller 190 may be initially encoded with a set of preliminary instructions (e.g., encoded on a machine-readable storage medium) that may require preliminary processing operations to prepare the instructions for execution based on criteria such as geographical locations, operating time and/or power needs of the vehicle and/or powertrain 102.

The preliminary processing may include combining the instructions with other data present obtained by the controller 190, translating the instructions to a different format, performing compression, decompression, encryption, and/or decryption, combining multiple files that include different sections of the instructions, integrating the instructions with other code present on a device, such as a library, an operating system, etc., or similar operations.

In one embodiment, a system 100 for monitoring and controlling hydrogen emission concentration in the exhaust of a fuel cell engine 110 may be implemented in a vehicle and/or powertrain 102 to achieve a target hydrogen emission concentration, configured to facilitate a regulatory readiness or compliance before the vehicle and/or powertrain 102 enters a restricted or regulated geographic region. In some embodiments, a system 100 for monitoring and controlling hydrogen emission concentration in the exhaust of a fuel cell engine 110 may be implemented in a vehicle and/or powertrain 102 as it approaches, is in vicinity of, enters, idles, docks, parks, and/or exits the restricted region. A restricted or regulated region of the present method or systems may be any geographical area or region with specific hydrogen emission regulations, limitations, and/or prohibitions.

The present system and method are capable of monitoring and controlling emissions, particularly hydrogen emissions to a level that is at or below a target hydrogen concentration (e.g., a predetermined hydrogen concentration). In one embodiment the target hydrogen concentration is up to about 8% by volume (of air). In further embodiments, the target hydrogen concentration is up to about 7% by volume, up to about 6% by volume, up to about 5% by volume or up to about 4% by volume. In some embodiments, the target hydrogen concentration is at least about 0.1% by volume. In other embodiments, the target hydrogen concentration is at least about 0.5% by volume, at least about 1% by volume, at least about 1.5% by volume or at least about 2% by volume.

The target hydrogen concentration may range from any one of the above defined lower limits (e.g. 0.1% by volume, 0.5% by volume etc.) to any one of the above defined upper limits (e.g. about 8% by volume, about 7% by volume etc.). In some embodiments, the target hydrogen concentration may range from about 0.1% by volume to about 8% by volume, including any specific percentage comprised therein. In some further embodiments, the target hydrogen concentration ranges from about 0.5% by volume to about 8% by volume, about 1% by volume to about 8% by volume, about 2% by volume to about 8% by volume, about 3% by volume to about 8% by volume or about 4% by volume to about 8% by volume.

In further embodiments, the target hydrogen concentration may range from about 0.1% by volume to about 7% by volume, about 0.1% by volume to about 6% by volume, about 0.1% by volume to about 5% by volume, or about 0.1% by volume to about 4% by volume. In some further embodiments, the target hydrogen concentration ranges from about 2% by volume to about 6% by volume or from about 3% by volume to about 5% by volume. In the aforementioned aspects and embodiments of the present disclosure, the target hydrogen concentration may, for example, be based on geographical and/or regulatory rules, guidelines, and/or regulations such that the target hydrogen concentration may be a geographical compliant hydrogen concentration and/or a regulatory compliant hydrogen concentration.

Of particular importance for implementation of the present system and method are applications in which the hydrogen emissions are released (e.g., as pollutants) into an environment that does not include any or appropriate hydrogen ventilation mechanisms. Specifically, facilities and/or structures that are unable to fully ventilate hydrogen emissions, and are therefore unable to maintain any present or real-time hydrogen concentration at or below the target hydrogen concentration described herein, are particular locations to implement and/or facilitate the present system or method. For example, indoor, closed, and/or underground applications (e.g., such as subway, tram, trolley, train, or bus stations or tunnels) where proper ventilation of hydrogen may be impeded, would be specific locations and applications that advantageously benefit from the present system and/or method for regulating hydrogen emissions.

In one embodiment, the controller 190 in a system 100 for monitoring and controlling hydrogen emission concentration in the exhaust of a fuel cell engine 110 in a vehicle and/or powertrain 102 may be implemented, in some cases, in communication with hardware, firmware, software, or any combination thereof present on or outside the vehicle and/or powertrain 102 comprising the fuel cell engine 110. Information may be transferred to the controller 190 using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

Figure 2:
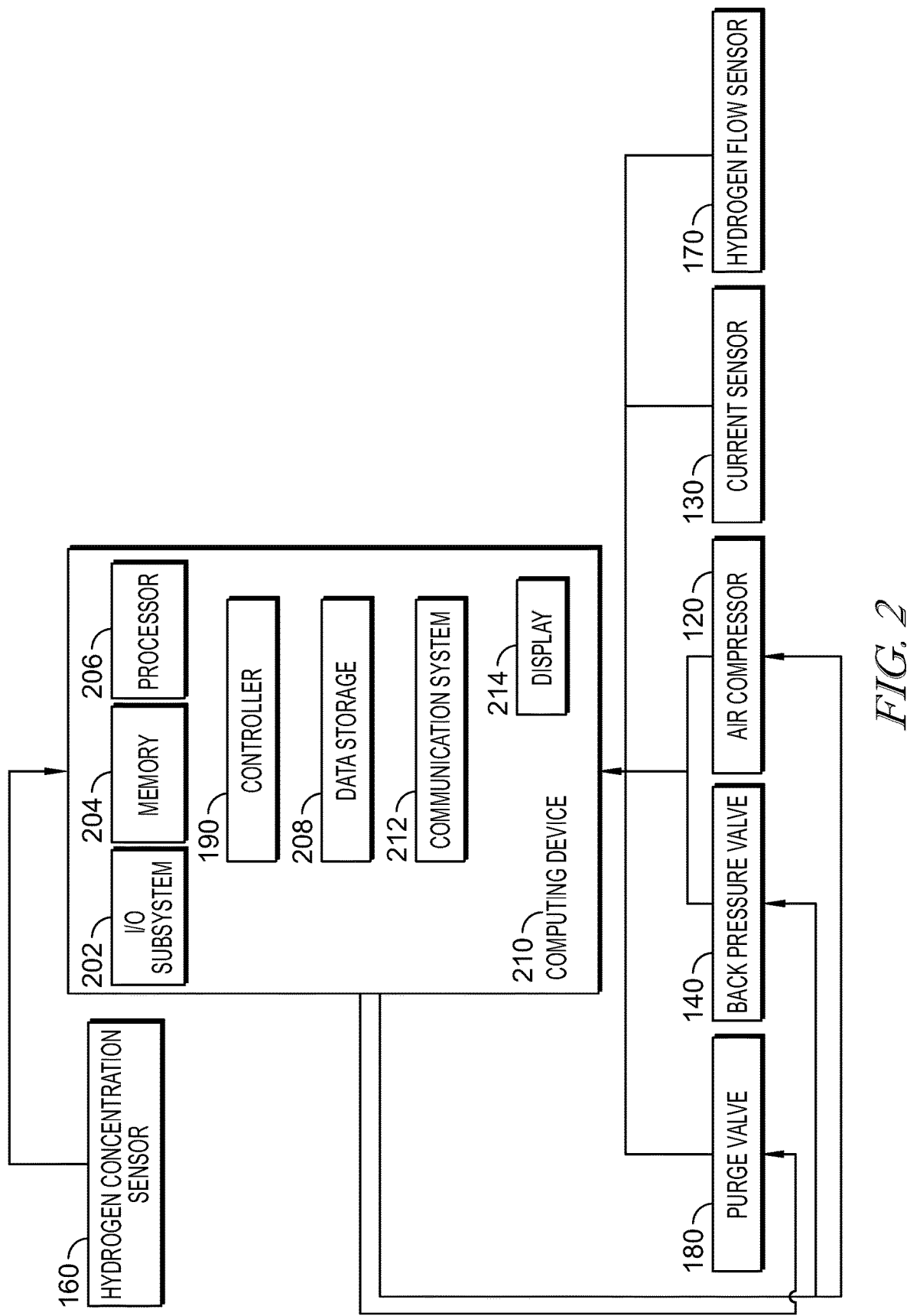
FIG. 2 is a block diagram showing one embodiment of a computing device comprising a controller in communication with various components of the system for monitoring and controlling emissions produced by a fuel cell engine.

In an illustrative embodiment, as shown in FIG. 2, the controller 190 may be in a computing device 210. The computing device 210 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device 210 may include an input/output (I/O) subsystem 202, a memory 204, a processor 206, a data storage device 208, a communication subsystem 212, a controller 190, and a display 214. The computing device 210 may include additional and/or alternative components, such as those commonly found in a computer (e.g., various input/output devices), in other embodiments. In other embodiments, one or more of the illustrative components may be incorporated in, or otherwise form a portion of, another component. For example, the memory 204, or portions thereof, may be incorporated in the processor 206.

The processor 206 may be embodied as any type of processor capable of performing the functions described herein. For example, the processor 206 may be embodied as a single or multi-core processor(s), digital signal processor, microcontroller, or other processor or processing/controlling circuit. The memory 204 may be embodied as any type of volatile or non-volatile memory or data storage capable of performing the functions described herein.

In operation, the memory 204 may store various data and software used during operation of the computing device 210 such as operating systems, applications, programs, libraries, and drivers. The memory 204 is communicatively coupled to the processor 206 via the I/O subsystem 202, which may be embodied as circuitry and/or components to facilitate input/output operations with the processor 206, the memory 204, and other components of the computing device 210.

For example, the I/O subsystem 202 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 204 may be directly coupled to the processor 206, for example via an integrated memory controller hub. Additionally, in some embodiments, the I/O subsystem 202 may form a portion of a system-on-a-chip (SoC) and be incorporated, along with the processor 206, the memory 204, and/or other components of the computing device 210, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. The computing device 210 also includes the communication subsystem 212, which may be embodied as any communication circuit, device, or collection thereof, capable of enabling communications between the computing device 210 and other remote devices. The communication subsystem 212 may be configured to use any one or more communication technology (e.g., wired or wireless communications) and associated protocols (e.g., Ethernet, InfiniBand®, Bluetooth®, Wi-Fi®, WiMAX, 3G, 4G LTE, 5G, etc.) to effect such communication.

The display 214 of the computing device 210 may be embodied as any type of display capable of displaying digital information, such as a liquid crystal display (LCD), a light emitting diode (LED), a plasma display, a cathode ray tube (CRT), or other type of display device. In some embodiments, the display 214 may be coupled to or otherwise include a touch screen or other input device.

The computing device 210 may also include any number of additional input/output devices, interface devices, hardware accelerators, and/or other peripheral devices. The computing devices 210 of a system 100 for monitoring and controlling hydrogen emission concentration of a fuel cell engine 110 in a vehicle and/or powertrain 102 may be configured into separate subsystems for managing data and coordinating communications throughout the vehicle and/or powertrain 102. In some embodiments, the controller 190 may also control the operational functionality and/or performance of additional aspects of the vehicle and/or powertrain 102 including but not limited to valves, actuators, sensors, storage tanks (e.g. water storage tank, fuel storage tank), batteries, air supply, motors, generators, and drive trains.

In one embodiment, as illustrated in FIG. 1, a method for monitoring and controlling hydrogen emission concentration of a fuel cell engine 110 in a vehicle and/or powertrain 102 may comprise setting the purge delay time and/or width time of the purge valve 180, calculating the volume of purged hydrogen 112 passing through the purge valve 180 based on the set purge delay time and/or width time of the purge valve 180, or using the hydrogen flow sensor 170 to detect the volume of purged hydrogen 112, determining the amount of purged air 114 that is exhausted from the fuel cell engine 110 into the exhaust mixer 150, and using the hydrogen concentration sensor 160 to monitor concentration of purged hydrogen 112 in the exhaust mixer 150 and the exhaust mixture 116 being released into the ambient surrounding.

In one embodiment, a method for monitoring and controlling hydrogen emission concentration of a fuel cell engine 110 in a vehicle and/or powertrain 102 may comprise decreasing, increasing, opening, closing, or adjusting valves, sensors, openings, actuators etc. to control the amount of purged hydrogen 112 and purged air 114 exiting the fuel cell engine 110. In some embodiments, a method for monitoring and controlling hydrogen emission concentration of a fuel cell engine 110 in a vehicle and/or powertrain 102 may comprise decreasing, increasing, opening, closing, or adjusting valves, sensors, openings, actuators etc. to control the amount of hydrogen 108 and air 106 entering the fuel cell engine 110.

In one embodiment, the method for monitoring and controlling hydrogen emission concentration of a fuel cell engine 110 in a vehicle and/or powertrain 102 may be a feedback loop. In some embodiments, the method for monitoring and controlling hydrogen emission concentration of a fuel cell engine 110 in a vehicle and/or powertrain 102 may also use and/or manage hydrogen emission concentration. These hydrogen emission concentrations may be based on hydrogen emission concentration targets, metrics, or guidelines, which may be dependent on geographical and/or regulatory rules and restrictions, and adjusting the flow or speed of air 106 and/or the flow of hydrogen 108 accordingly.

It will be appreciated that in the above described aspects and embodiments of the disclosure, reference to the exhaust mixer may be considered to refer to an exhaust mixer configured to perform its intended function, such as to mix purged hydrogen from the fuel cell engine with air. Reference to the purge valve may be considered to refer to a purge valve configured to perform its intended function, such as a purge valve configured to control a flow of purged hydrogen from the fuel cell engine to the exhaust mixer. Reference to the hydrogen flow sensor may be considered to refer to a hydrogen flow sensor configured to perform its intended function, such as a hydrogen flow sensor configured to measure or determine the flow of purged hydrogen in to the exhaust mixer. Reference to the hydrogen concentration sensor may be considered to refer to a hydrogen concentration sensor configured to perform its intended function, such as a hydrogen concentration sensor configured to monitor a concentration of purged hydrogen in the exhaust mixer. Reference to an air handling device may be considered to refer to an air handling device configured to perform its intended function, such as an air handling device configured to control a flow of air into the fuel cell engine. Reference to a back pressure valve may be considered to refer to a back pressure valve configured to perform its intended function, such as a back pressure valve configured to control a flow of air from the fuel cell engine into the exhaust mixer. Furthermore, reference to the controller may be considered to refer to a controller that is configured to perform its intended function, such as a controller is configured to communicate with the purge valve, the back pressure valve, the hydrogen flow sensor, the hydrogen concentration sensor, and the air handling device to provide power to the vehicle and/or powertrain at a target hydrogen concentration.

The above embodiments are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated.

Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third," and the like, as used herein do not denote any order or importance, but rather are used to distinguish one element from another. The term "or" and "and/or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of"

refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A control system for monitoring and controlling emissions produced by a fuel cell engine in a vehicle and/or a powertrain, the system comprising:
    an exhaust mixer configured to mix purged hydrogen from the fuel cell engine with air before being released;
    a purge valve configured to control a flow of the purged hydrogen from the fuel cell engine to the exhaust mixer;
    a hydrogen concentration sensor configured to monitor a concentration of the purged hydrogen in the exhaust mixer;
    an air handling device configured to direct the air into the fuel cell engine;
    a back pressure valve configured to control a flow of the air from the fuel cell engine into the exhaust mixer; and
    a controller configured to set a purge delay time and a width time of the purge value and to determine a volume of hydrogen from the fuel cell engine based on the purge delay time or the width time of the purge valve, and further configured to adjust one or more of a speed of the air handling device, the purge valve, or the back pressure valve in response to the monitored concentration of purged hydrogen by the hydrogen concentration sensor when different than a target hydrogen concentration.

2. The system of claim 1, further comprising a hydrogen flow sensor is located upstream of or downstream of the purge valve.

3. The system of claim 1, wherein the controller is configured to adjust an air flow from the air handling device by changing the speed of the air handling device in response to the monitored concentration of purged hydrogen by the hydrogen concentration sensor being different than the target hydrogen concentration.

4. The system of claim 1, wherein the controller is configured to adjust an opening of the back pressure valve opening in response to the monitored concentration of purged hydrogen by the hydrogen concentration sensor being different than the target hydrogen concentration.

5. The system of claim 4, wherein the hydrogen concentration sensor is configured to detect the concentration of purged hydrogen in the exhaust mixer, wherein an opening of the purge valve is adjusted in response to the monitored concentration of purged hydrogen, and wherein the opening of the purge value is different if the concentration of purged hydrogen differs from the target hydrogen concentration.

6. The system of claim 1, wherein in response to the hydrogen concentration sensor detecting the concentration of purged hydrogen to be greater than the target hydrogen concentration, the controller increases the speed of the air handling device, adjusts an opening of the back pressure valve, adjusts a purge delay time, or adjusts a width time of the purge valve to decrease a volume of purged hydrogen being passed through the purge valve.

7. The system of claim 1, wherein the target hydrogen concentration ranges from about 0.1% to about 8.0% by volume.

8. A method of monitoring and controlling hydrogen emission concentrations of a fuel cell engine in a vehicle and/or a powertrain, the method comprising:
- setting a purge delay time and/or width time of a purge valve,
- calculating a volume of purged hydrogen configured to pass through the purge valve,
- determining an amount of purged air that is passed into the fuel cell engine by an air handling device,
- mixing the purged air and the purged hydrogen in an exhaust mixer to form an exhaust,
- monitoring a volume of the purged hydrogen in the exhaust using a hydrogen concentration sensor,
- changing a speed of the air handling device or the purge valve when the hydrogen concentration sensor detects a difference between the monitored volume of the purged hydrogen and a target hydrogen concentration, and releasing the exhaust from the exhaust mixer.

9. The method of claim 8, wherein the hydrogen concentration sensor detects the monitored volume of purged hydrogen to be greater than the target hydrogen concentration.

10. The method of claim 9, further comprising passing air from the fuel cell engine into the exhaust mixer using a back pressure valve in response to the monitored volume of purged hydrogen by the hydrogen concentration sensor being different than the target hydrogen concentration.

11. The method of claim 10, further comprising increasing the speed of the air handling device, adjusting an opening of the back pressure valve, adjusting a purge delay time or adjusting a width time of the purge valve to decrease a volume of purged hydrogen being passed through the purge valve in response to the monitored volume of purged hydrogen by the hydrogen concentration sensor being different than the target hydrogen concentration.

12. The method of claim 8, wherein the hydrogen concentration sensor detects the monitored volume of purged hydrogen to be less than the target hydrogen concentration.

13. The method of claim 12, further comprising directing air from the fuel cell engine into the exhaust mixer using a back pressure valve in response to the monitored volume of purged hydrogen by the hydrogen concentration sensor being different than the target hydrogen concentration.

14. The method of claim 13, further comprising decreasing the speed of the air handling device, adjusting an opening of the back pressure valve, adjusting a purge delay time or adjusting a width time of the purge valve to increase a volume of purged hydrogen being passed through the purge valve in response to the monitored volume of purged hydrogen by the hydrogen concentration sensor being different than the target hydrogen concentration.

15. The method of claim 8, further comprising detecting a flow of the purged hydrogen in to the exhaust mixer with a hydrogen flow sensor.

16. The method of claim 15, wherein the hydrogen flow sensor is located upstream or downstream of the purge valve.

17. The method of claim 8, wherein the target hydrogen concentration ranges from about 0.1% to about 8.0% by volume.

18. The method of claim 8, further comprising communicating with a current sensor to detect an operating current of the fuel cell engine.

19. A control system for monitoring and controlling emissions produced by a fuel cell engine in a vehicle and/or a powertrain, the system comprising:
- an exhaust mixer configured to mix purged hydrogen from the fuel cell engine with air before being released;
- a purge value configured to control a flow of the purged hydrogen from the fuel cell engine to the exhaust mixer;
- a hydrogen concentration sensor configured to minitor a concentration of the purged hydrogen in the exhaust mixer;
- an air handling device configured to direct the air into the fuel cell engine;
- a back pressure valve configured to control a flow of the air from the fuel cell engine into the exhaust mixer; and
- a controller configured to adjust one or more of a speed of the air handling device, the purge valve, or the back pressure valve in response to the monitored concentration of purged hydrogen by the hydrogen concentration sensor when different than a target hydrogen concentration, wherein in response to the hydrogen concentration sensor detecting the concentration of purged hydrogen to be less than the target hydrogen concentration, the controller is configured to decrease the speed of the air handling device, adjust an opening of the back pressure valve, adjust a purge delay time, or adjust a width time of the purge valve to increase a volume of purged hydrogen being passed through the purge valve.

20. The system of claim 19, wherein the target hydrogen concentration ranges from about 0.1% to about 8.0% by volume.

* * * * *